(12) United States Patent
Ramsdell et al.

(10) Patent No.: US 12,150,416 B2
(45) Date of Patent: Nov. 26, 2024

(54) TREE SECTION LOWERING ASSEMBLY

(71) Applicants: Seth W. Ramsdell, Sylvania, OH (US); Jack W. Martin, Sylvania, OH (US)

(72) Inventors: Seth W. Ramsdell, Sylvania, OH (US); Jack W. Martin, Sylvania, OH (US)

(*) Notice: Subject to any disclaimer, the term of this patent is extended or adjusted under 35 U.S.C. 154(b) by 750 days.

(21) Appl. No.: 17/350,289

(22) Filed: Jun. 17, 2021

(65) Prior Publication Data

US 2021/0392826 A1 Dec. 23, 2021

Related U.S. Application Data

(60) Provisional application No. 63/040,597, filed on Jun. 18, 2020.

(51) Int. Cl.
*A01G 23/02* (2006.01)
*B66D 5/16* (2006.01)

(52) U.S. Cl.
CPC .............. *A01G 23/02* (2013.01); *B66D 5/16* (2013.01)

(58) Field of Classification Search
CPC .. A62B 1/06; A62B 1/14; A01G 23/02; A01G 23/099; B66D 1/7415; B66D 1/60; B66D 1/36; B66D 3/04; B66D 3/06; B66D 3/26; B66D 2700/026
USPC ....................................................... 254/403
See application file for complete search history.

(56) References Cited

U.S. PATENT DOCUMENTS

| | | | | |
|---|---|---|---|---|
| 194,507 A | * | 8/1877 | Van Wie | A62B 1/06 188/65.4 |
| 285,603 A | * | 9/1883 | Fell | A62B 1/14 188/65.3 |
| 293,689 A | * | 2/1884 | Usborne | A62B 1/14 248/67 |
| 297,883 A | * | 4/1884 | Ware et al. | A62B 1/14 188/65.3 |
| 554,587 A | * | 2/1896 | Evans | A62B 1/14 188/77 R |

(Continued)

OTHER PUBLICATIONS

Tchukki Andersen, BCMA, CTSP, With Seth Ramsdell, "The Jail Brake Lowering Device", TCI Magazine official publication of the Tree Care Industry Association, Dec. 1, 2021, https://tcimag.tcia.org/product-features/the-jail-brake-lowering-device/.

(Continued)

*Primary Examiner* — Michael R Mansen
*Assistant Examiner* — Henrix Soto
(74) *Attorney, Agent, or Firm* — C. Fred Charpie, III; Ward Law Office LLC

(57) ABSTRACT

A tree section lowering assembly is provided. The tree section lowering assembly includes a support member having a first side, an opposing second side, a first end, and an opposing second end. A plurality of rung members extend from the first side of the support member. Each of the plurality of rung members has an outer surface configured to facilitate a frictional, sliding engagement with an interlaced rigging line. A reinforcement member extends from the second side of the support member and is configured to structurally support the support member. An upper line guide extends from a rung member at the located first end of the support member and a lower line guide extends from a different rung member located at the second end of the support member.

20 Claims, 11 Drawing Sheets

(56) References Cited

U.S. PATENT DOCUMENTS

| | | | | |
|---|---|---|---|---|
| 946,588 | A | * | 1/1910 | Thuener ............ A62B 1/06 182/5 |
| 3,235,031 | A | | 2/1966 | Cenker |
| 3,260,328 | A | * | 7/1966 | McGowan .......... A62B 1/06 182/5 |
| 4,239,188 | A | * | 12/1980 | Hobbs ............... B66D 1/60 414/23 |
| 4,311,218 | A | | 1/1982 | Steffen |
| 4,372,422 | A | | 2/1983 | Sharp |
| 4,470,480 | A | | 9/1984 | Celez |
| D330,671 | S | | 11/1992 | Greene et al. |
| 5,295,559 | A | | 3/1994 | Nutkins |
| 5,921,353 | A | | 7/1999 | Day |
| 5,971,363 | A | * | 10/1999 | Good ................. B66D 1/04 254/323 |
| D427,048 | S | | 6/2000 | Potter et al. |
| 7,007,927 | B2 | * | 3/2006 | Halas ................. A62B 1/06 254/389 |
| D627,208 | S | | 11/2010 | Huang |
| D638,693 | S | | 5/2011 | Caso |
| 8,794,392 | B2 | | 8/2014 | Kowatsch |
| 8,950,550 | B2 | * | 2/2015 | Maurice .............. A62B 1/14 24/115 R |
| D907,988 | S | | 1/2021 | Yu |
| 11,198,026 | B2 | | 12/2021 | Bogardus, Jr. |
| D947,010 | S | | 3/2022 | Lv |
| D977,949 | S | | 2/2023 | Li |
| D1,000,609 | S | | 10/2023 | Jansson |
| 2019/0314650 | A1 | | 10/2019 | Cowell et al. |
| 2020/0384317 | A1 | | 12/2020 | Kimble |
| 2022/0233891 | A1 | | 7/2022 | Nieuwenhuis et al. |
| 2024/0082643 | A1 | | 3/2024 | Brown |

OTHER PUBLICATIONS

Forestry Suppliers, "Jail Brake 5-Rung Lowering Device", website, ebay.com, https://www.ebay.com/itm/125966825020.

Green Pro Supplies, "Notch Flow Adjust Rope Wrench & Tether Kit 51258", website, ebay.com, https://www.ebay.com/itm/225751846081.

* cited by examiner

TREE SECTION LOWERING ASSEMBLY

RELATED APPLICATIONS

This application claims the benefit of pending U.S. Provisional Patent Application No. 63/040,597 filed Jun. 18, 2020, the disclosure of which is incorporated herein by reference in its entirety.

BACKGROUND

Trimming tree limbs and/or removing sections of trees can involve handling large and heavy loads. In certain instances, the tree limbs or tree sections being removed are initially positioned at elevated locations. It is incumbent on trimming personnel to move the trimmed limb or removed section to the ground in a controlled manner.

Conventional lowering devices, in combination with one or more rigging lines, can be used to assist in the lowering of the trimmed limb or removed section to the ground. However, conventional lowering devices can be problematic. In certain instances, conventional devices are known to cause the rigging lines to twist. In other instances, conventional lowering devices can be engaged by the rigging line without properly interfacing.

It would be advantageous if tree section lowering devices could be improved.

SUMMARY

It should be appreciated that this Summary is provided to introduce a selection of concepts in a simplified form, the concepts being further described below in the Detailed Description. This Summary is not intended to identify key features or essential features of this disclosure, nor it is intended to limit the scope of the tree section lowering assembly.

The above objects as well as other objects not specifically enumerated are achieved by a tree section lowering assembly. The tree section lowering assembly includes a support member having a first side, an opposing second side, a first end, and an opposing second end. A plurality of rung members extend from the first side of the support member. Each of the plurality of rung members has an outer surface configured to facilitate a frictional, sliding engagement with an interlaced rigging line. A reinforcement member extends from the second side of the support member and is configured to structurally support the support member. An upper line guide extends from a rung member at the located first end of the support member and a lower line guide extends from a different rung member located at the second end of the support member.

The above objects as well as other objects not specifically enumerated are also achieved by a method of using a tree section lowering assembly. The method includes the steps of attaching the tree section lowering assembly to a stable structure, the tree section lowering assembly have a plurality of rung members extending from a support member, extending a rigging line from a ground location through the plurality of rung members of the tree section lowering assembly in an interlacing manner, extending the rigging line from the tree section lowering assembly and securing the rigging line to a section of the tree to be removed and lowered to a ground surface, separating the section of the tree to be removed and lowered to a ground surface from the tree, tensioning the rigging line, facilitating a frictional, sliding engagement of the interlaced rigging line with the plurality of rung members, thereby controlling lowering of the section of the tree to the ground surface.

Various objects and advantages of the tree section lowering assembly will become apparent to those skilled in the art from the following Detailed Description, when read in light of the accompanying drawings.

DETAILED DESCRIPTION

Figure 1:
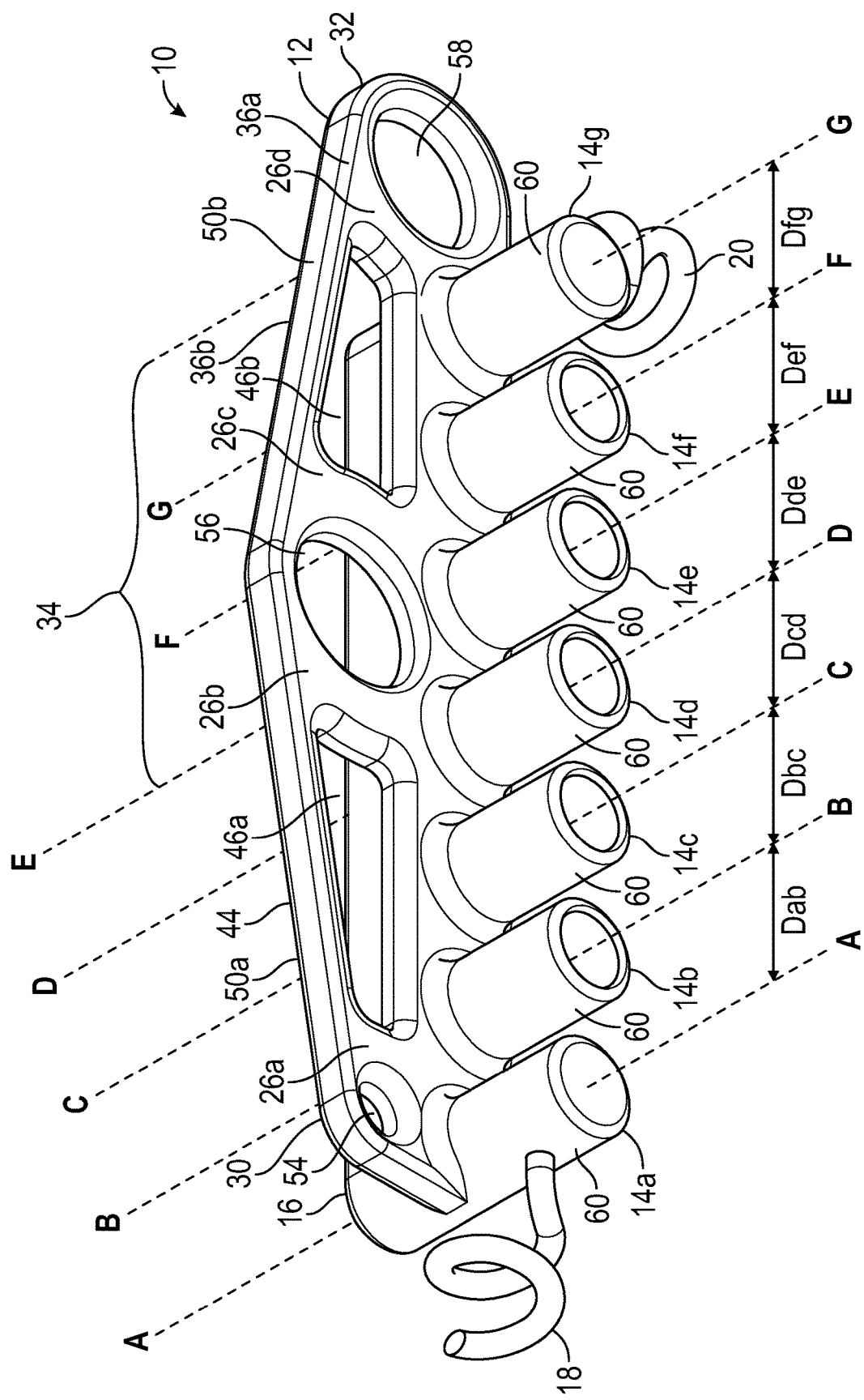
FIG. 1 is a right side perspective view of a first embodiment of a tree section lowering assembly in accordance with the invention.

The tree section lowering assembly will now be described with occasional reference to specific embodiments. The tree section lowering assembly may, however, be embodied in different forms and should not be construed as limited to the embodiments set forth herein. Rather, these embodiments are provided so that this disclosure will be thorough and complete, and will fully convey the scope of the tree section lowering assembly to those skilled in the art.

Unless otherwise defined, all technical and scientific terms used herein have the same meaning as commonly understood by one of ordinary skill in the art to which the tree section lowering assembly belongs. The terminology used in the description of the tree section lowering assembly herein is for describing particular embodiments only and is not intended to be limiting of the tree section lowering assembly. As used in the description of the tree section lowering assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the tree section lowering assembly. Notwithstanding that the numerical ranges and parameters setting forth the broad scope of the tree section lowering assembly are approximations, the numerical values set forth in the specific examples are reported as precisely as possible. Any numerical values, however, inherently contain certain errors necessarily resulting from error found in their respective measurements.

The description and figures disclose a tree section lowering assembly. Generally, the tree section lowering assembly includes a plurality of bearing rung members configured to frictionally engage an interlaced rigging line in a manner such that limbs and other sections of trees, positioned at elevated locations, can be lowered in a safe and efficient manner.

Referring now to the drawings, there is illustrated in FIGS. 1-6, a non-limiting embodiment of a tree section lowering assembly (hereafter "lowering assembly") in accordance with the invention at 10. The lowering assembly 10 includes a support member 12, a plurality of spaced-apart bearing rung members 14a-14g (hereafter "rung members"), a reinforcement member 16, an upper line guide 18 and a lower line guide 20.

Referring now to FIGS. 1, 3, 5 and 6, the support member 12 is configured for several functions. First, the support member 12 is configured to structurally support the plurality of spaced-apart rung members 14a-14g. The support member 12 is further configured for attachment to a portion of a tree.

Figure 3:
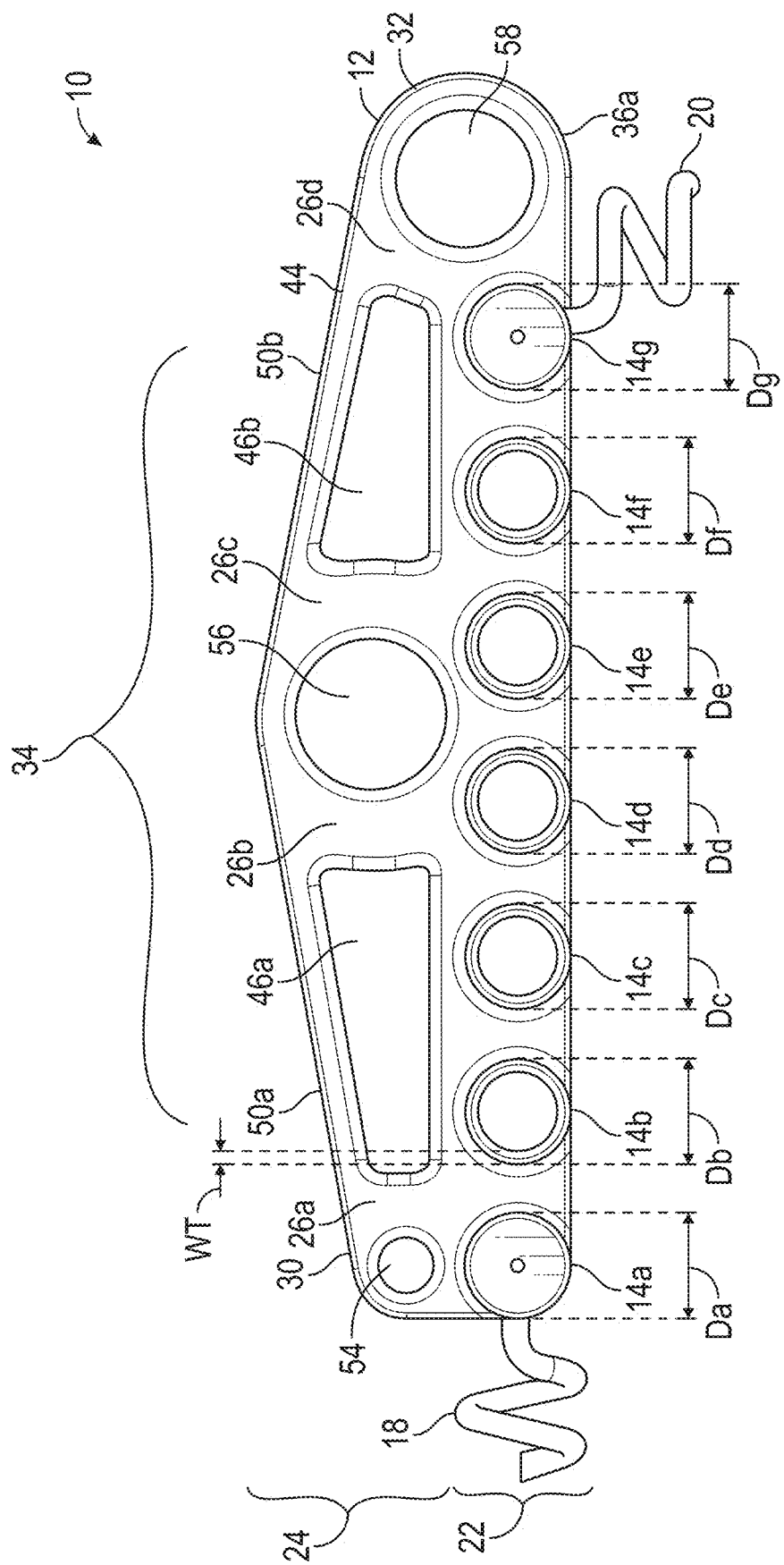
FIG. 3 is a front view of the tree section lowering assembly of FIG. 1.
Figure 5:
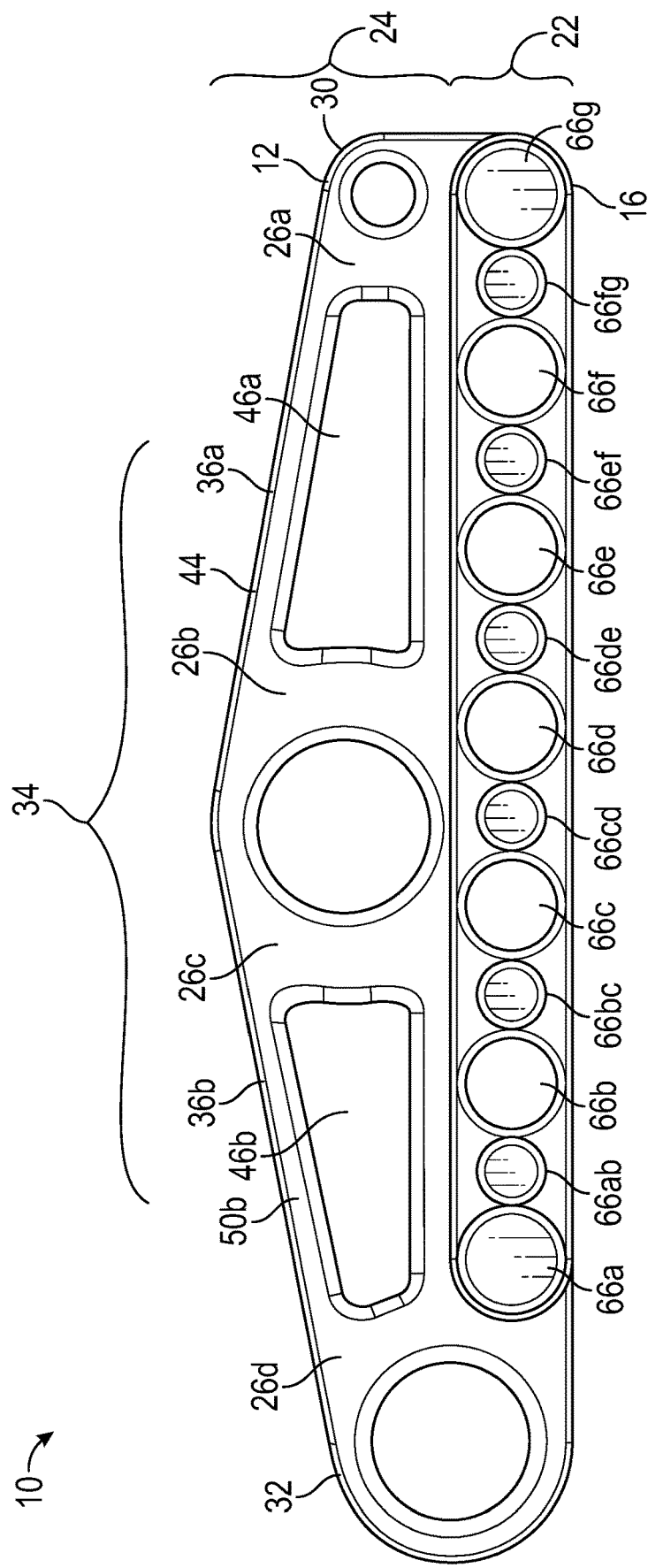
FIG. 5 is a rear view of the tree section lowering assembly of FIG. 1.

Referring now to FIGS. 1, 3 and 5, the support member 12 includes a rung section 22, a flange portion 24 and a plurality of legs 26a-26d extending therebetween. The support member 12 further includes a first end 30, a second end 32, a center portion 34 extending therebetween, a first side 36a and an opposing second side 36b.

Referring again to FIGS. 1, 2, 4 and 5, the rung section 22 of the first side of the support member 12 includes the plurality of rung members 14a-14g. The rung section 22 of the opposing second side 36b of the support member 12 includes the reinforcement member 16. The flange portion 24 of the support member 12 includes a spline 44 connected to each of the plurality of legs 26a-26d.

Referring now to FIGS. 1, 3 and 5, the flange portion 24 includes a plurality of spaced apart cutouts 46a, 46b. The cutouts 46a, 46b are configured to remove material from the lowering assembly 10, thereby reducing the weight of the lowering assembly 10. In the illustrated embodiment, each of the cutouts 46a, 46b has a quadrilateral cross-sectional shape. However, in alternate embodiments, each of the cutouts 46a, 46b can have other cross-sectional shapes sufficient to reduce the weight of the lowering assembly 10. While FIGS. 1, 3 and 5 show the cutouts 46a, 46b as having the same quadrilateral cross-sectional shape, it is further contemplated that in other embodiments, the cross-sectional shapes of each of the cutouts 46a, 46b can be different from each other.

Referring again to FIGS. 1, 3 and 5, the plurality of spaced apart cutouts 46a, 46b form handle portions 50a, 50b configured for gripping by a user. The handle portions 50a, 50b can have any desired length. Optionally, the handle portions 50a, 50b can include a plurality of surface structures (not shown). The term "surface structure", as used herein, is defined to mean any structure or treatment located on or extending from a surface. The surface structures are configured to maximize engagement and minimize slippage of the user's hands during use of the lowering assembly 10. In certain instances, the surface structures can have the form of a knurled surface. The term "knurled surface", as used herein, is defined to mean a series of intersecting cross hatchings forming raised ridges or projections. However, the surface structures can have other desired forms.

Referring now to FIGS. 1 and 3, a first attachment aperture 54 is positioned in the flange portion 24 of the support member 12 and adjacent the first end 30, a second attachment aperture 56 is located in the center portion 34 and a third attachment aperture 58 is located in the flange portion 24 and adjacent the second end 32. As will be discussed in more detail below, the attachment apertures 54, 56 and 58 are configured for securing the lowering assembly 10 to a support, such as the non-limiting example of a stable portion of a tree being trimmed or removed. The attachment apertures 54, 56 and 58 are further configured as attachment points for equipment when users are ascending to or descending from elevated positions within a tree. In the illustrated embodiments, the attachment apertures 54, 56 and 58 have a circular cross-sectional shape. In alternate embodiments, it is contemplated that the attachment apertures 54, 56 and 58 can have other cross-sectional shapes sufficient for the functions described herein.

Figure 2:
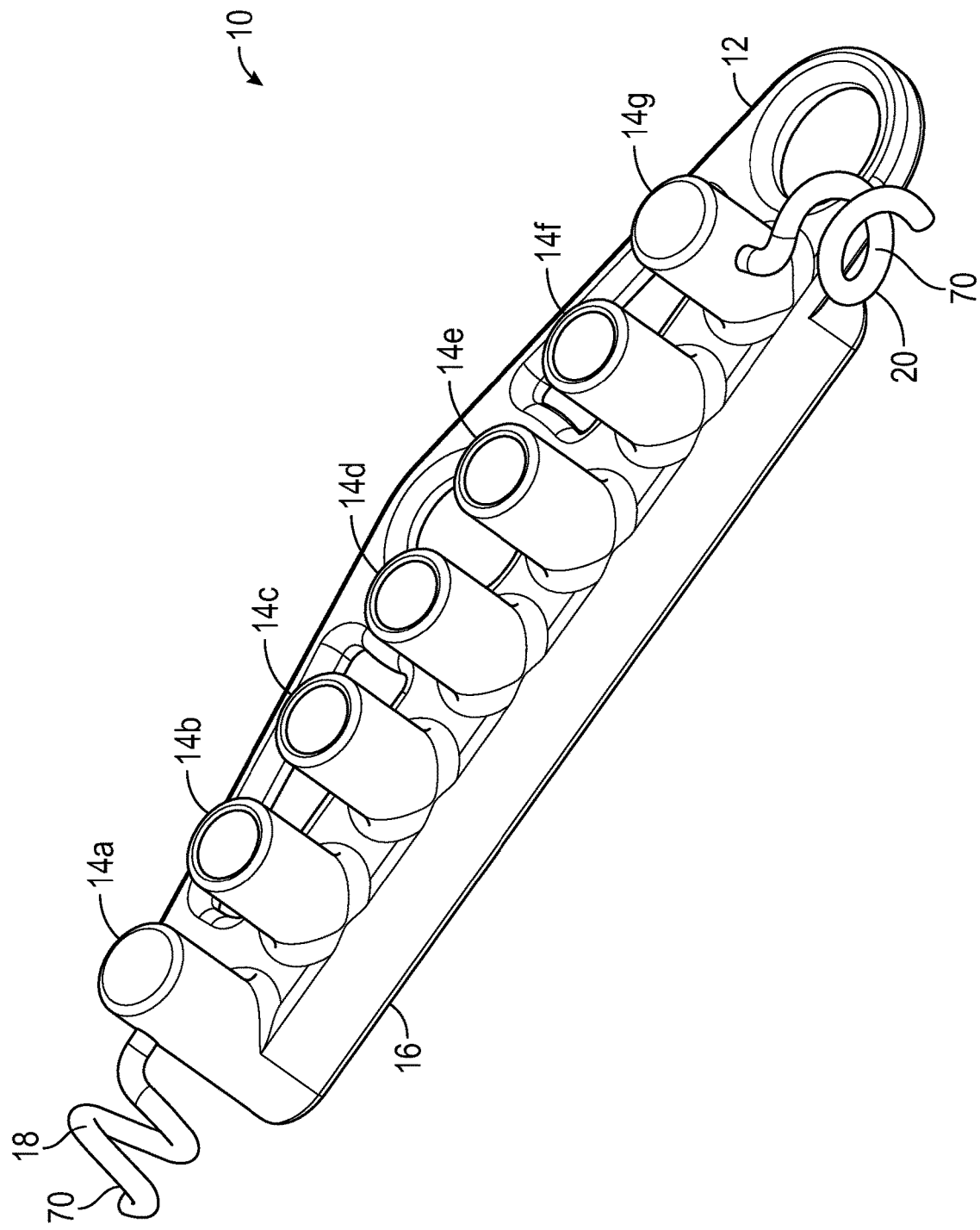
FIG. 2 is another right side perspective view of the tree section lowering assembly of FIG. 1.
Figure 4:
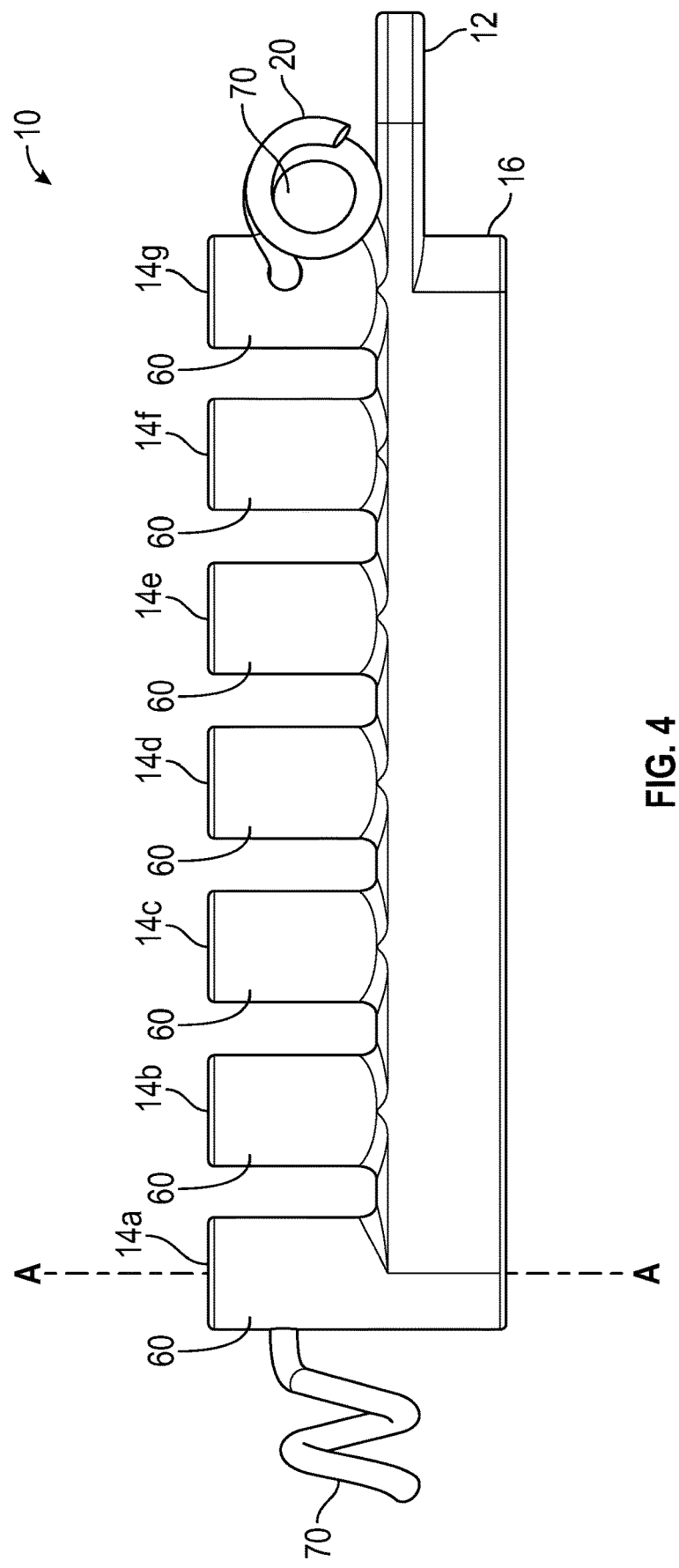
FIG. 4 is a bottom view of the tree section lowering assembly of FIG. 1.

Referring now to FIGS. 1, 2 and 4, the rung members 14a-14g are illustrated. The rung members 14a-14g are configured for several functions. First, the rung members 14a-14g are configured to provide an interlaced pathway for a rigging line 40 moving through the rung members 14a-14g. The term "interlaced", as used herein, is defined to mean the weaving of the rigging line 40 around a top portion of one rung member and around a bottom portion of an adjacent rung member. The interlacing of the rigging line around the plurality of rung members 14a-14g will be discussed in more detail below. Each of the rung members 14a-14g has an outer surface 60 that is configured to facilitate frictional, sliding engagement with the interlaced rigging line 40.

Figure 6:
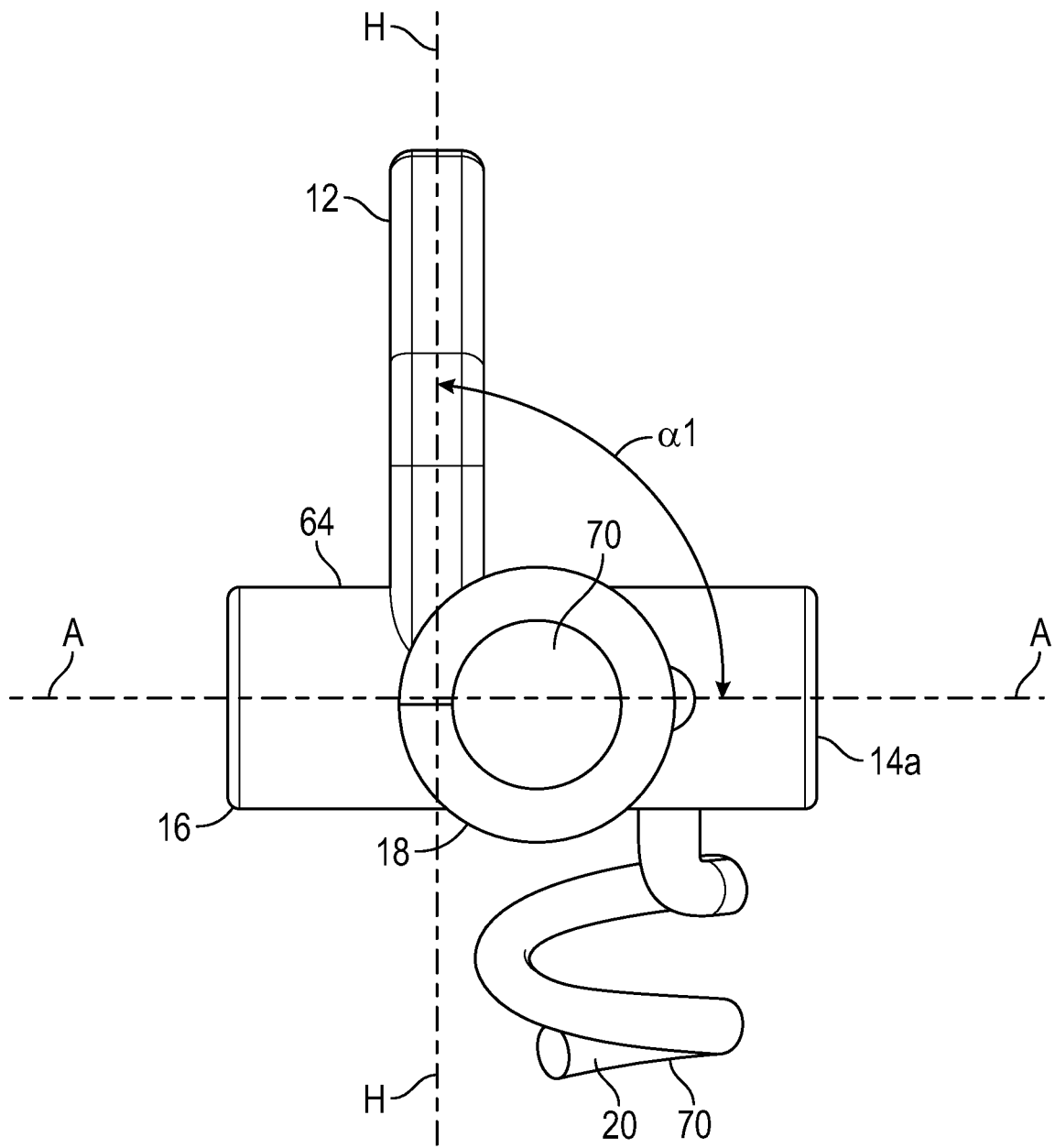
FIG. 6 is an end view of the tree section lowering assembly of FIG. 1.

Referring again to FIGS. 1, 2, 4 and 6, the rung member 14a is illustrated. The rung member 14a extends from the first side 36a of the support member 12 and has a cylindrical geometric shape. The rung member 14a is centered on a longitudinal axis A-A. Referring now to FIG. 6, the longitudinal axis A-A of the rung member 14a forms an angle αa with a lateral axis H-H formed by the support member 12. In the illustrated embodiment, the angle αa is about 90°. Without being held to the theory, it is believed the angle αa of about 90° provides an optimum interlacing pathway and an optimum arrangement to facilitate the frictional, sliding engagement with the interlaced rigging line 40. However, in other embodiments, the angle αa can be more or less than about 90°, sufficient to optimize the functions described herein.

Referring again to FIGS. 1, 2, 4 and 6, in a similar manner each of the rung members 14b-14g extend from the first side 36a of the support member 12 and have a cylindrical geometric shape. The rung members 14b-14g are each centered on a respective longitudinal axis B-B, C-C, D-D, E-E, F-F and G-G. Each of the longitudinal axes B-B, C-C, D-D, E-E, F-F and G-G forms an angle αb-αg with a lateral axis H-H formed by the support member 12. In the illustrated embodiment, each of the angles αb-αg is about 90°. Without being held to the theory, it is believed the angles αb-αg of about 90° provides an optimum interlacing pathway and an optimum arrangement to facilitate the frictional, sliding engagement with the interlaced rigging line 40. However, in other embodiments, the angles αb-αg can be more or less than about 90°, sufficient to optimize the functions described herein.

Referring now to FIG. 1, the longitudinal axes A-A, B-B, C-C, D-D, E-E, F-F and G-G of the rung members 14b-14g are illustrated. In the illustrated embodiment, the longitudinal axes A-A, B-B, C-C, D-D, E-E, F-F and G-G of the rung members 14b-14g are arrangement in a substantially parallel orientation with each other. Without being held to the theory, it is believed the substantially parallel orientation of the longitudinal axes A-A, B-B, C-C, D-D, E-E, F-F and G-G of the rung members 14b-14g provides an optimum interlacing pathway and an optimum arrangement to facilitate the frictional, sliding engagement with the interlaced rigging line 40. However, in other embodiments, the longitudinal axes A-A, B-B, C-C, D-D, E-E, F-F and G-G of the rung members 14b-14g can be arranged in other manners, sufficient to optimize the functions described herein.

Referring now to FIGS. 1-3, the outermost rung members 14a, 14g have a different structure than the inner rung members 14b-14f. The rung members 14a, 14g are formed as solid cylinders and the rung members 14b-14f are formed as hollow cylinders. Without being held to the theory, it is believed the outermost rung members 14a, 14g incur the largest stresses from the rigging line 40 during operation of the lowering assembly 10 as each of the outermost rung members 14a, 14g is used to provide direction to the rigging line 40 in addition to incurring frictional, sliding engagement with the interlaced rigging line 40.

Referring now to FIG. 3, each of the rung members 14a-14g has a respective diameter Da-Dg. The diameters Da-Dg of the rung members 14a-14g can vary with a diameter of the rigging line 40. In the illustrated embodiment, the diameters Da-Dg are the same and are in a range of from about 1.0 inches to about 3.0 inches corresponding to a diameter of the rigging line 40 of about 1.0 inch. Without being held to the theory, it is believed the diameters Da-Dg of from about 1.0 inches to about 3.0 inches provides an optimum interlacing pathway and an optimum arrangement to facilitate the frictional, sliding engagement with an interlaced rigging line 40 having a diameter of about 1.0 inch. However, in other embodiments, the diameters Da-Dg of the rung members 14a-14g can be different corresponding to a different diameter of the rigging line, sufficient to optimize the functions described herein. While FIG. 3 shows the rung members 14a-14g as having the same diameter, it is further contemplated that in other embodiments, each of the rung members 14a-14g can have a different diameter sufficient for the functions described herein.

Referring now to FIG. 1, each of the longitudinal axes A-A, B-B, C-C, D-D, E-E, F-F and G-G of the respective rung members 14a-14g is separated by a distance Dab, Dbc, Dcd, Dde, Def and Dfg. The distances Dab, Dbc, Dcd, Dde, Def and Dfg between the longitudinal axes A-A, B-B, C-C, D-D, E-E, F-F and G-G can vary with a diameter of the rigging line 40. In the illustrated embodiment, the distances Dab, Dbc, Dcd, Dde, Def and Dfg are the same and are in a range of from about 1.5 inches to about 4.0 inches corresponding to a diameter of the rigging line 40 of about 1.0 inch. Without being held to the theory, it is believed the distances Dab, Dbc, Dcd, Dde, Def and Dfg of from about 1.5 inches to about 4.0 inches provides an optimum interlacing pathway and an optimum arrangement to facilitate the frictional, sliding engagement with an interlaced rigging line 40 having a diameter of about 1.0 inch. However, in other embodiments, the distances Dab, Dbc, Dcd, Dde, Def and Dfg between the longitudinal axes A-A, B-B, C-C, D-D, E-E, F-F and G-G can be different corresponding to a different diameter of the rigging line, sufficient to optimize the functions described herein.

Referring again to FIG. 3, each of the inner rung members 14b-14f has a wall thickness WT. The wall thickness WT is configured to provide sufficient structural integrity to the rung members 14b-14f such that the rung members 14b-14f avoid deformation during use of the lowering assembly 10. The wall thickness WT is also configured to be sufficiently thin such as to reduce the weight of the lowering assembly 10. In the illustrated embodiment, the wall thickness WT is in a range of from about 0.25 inches to about 1.0 inches. However, in other embodiments, the wall thickness WT can be less than about 0.25 inches or more than about 1.0 inches, sufficient to provide sufficient structural integrity to the rung members 14b-14f such that the rung members 14b-14f avoid deformation during use of the lowering assembly 10 while also reducing the weight of the lowering assembly 10. In other embodiments, it is contemplated that the wall thicknesses WT of the various inner rung members 14b-14f can be different from each other. In still other embodiments, it is contemplated that the wall thickness WT of the various rung members can vary as the rung member extends from the support member 12. In this embodiment, the wall thickness can taper as the rung member extends from the support member 12.

Referring now to FIGS. 4-6, the reinforcement member 16 is illustrated. The reinforcement member 16 is configured to provide structural support to the support member 12 during use of the lowering assembly 10. The reinforcement member 16 extends in a radial direction from the second side 36b of the support member 12 and in a longitudinal direction from one outer rung member 14a to the opposite outer rung member 14g. The reinforcement member 16 has the form of a bar 64 with a plurality of apertures 66a-66g, 66ab, 66bc, 66cd, 66de, 66ef and 66fg. The plurality of apertures 66a-66g, 66ab, 66bc, 66cd, 66de, 66ef and 66fg are configured to reduce the weight of the reinforcement member 16 while maintaining the structural integrity of the support provided to the support member 12. Each of the plurality of apertures 66a-66g, 66ab, 66bc, 66cd, 66de, 66ef and 66fg has an axis that is parallel with the axes formed by the rung members 14a-14g. The apertures 66a-66g axially align with the axes formed by rung members 14a-14f and the apertures 66ab, 66bc, 66cd, 66de, 66ef and 66fg are positioned between the respective rung members 14a-14g. In the illustrated embodiment, the apertures 66a, 66ab, 66bc, 66cd, 66de, 66ef, 66fg and 66g extend in an inward direction to the support member 12 and the apertures 66b-66f extend to and align with the hollow portion of the hollow rung members 14b-14f. However, it should be appreciated that in other embodiment, the apertures can form other structures sufficient to reduce the weight of the reinforcement member 16 while maintaining the structural integrity of the support provided to the support member 12.

Referring again to FIGS. 1-6, the support member 12, the plurality of rung members 14a-14g and the reinforcement member 16 are formed as a unitary body. The term "unitary", as used herein, is defined to mean the support member 12, the plurality of rung members 14a-14g and the reinforcement member 16 form a one-piece structure. The use of a unitary structure is configured to provide structural rigidity to the lowering assembly 10 and resistance to the stresses incurred during use. In the illustrated embodiment, the unitary structure of the support member 12, the plurality of rung members 14a-14g and the reinforcement member 16 is initially formed from a cast aluminum material, such as the non-limiting example of precipitation-hardened aluminum alloy no. 6061 and the casting is subsequently machined for various details. In alternate embodiments, the unitary structure of the support member 12, the plurality of rung members 14a-14g and the reinforcement member 16 can be formed from other suitable metallic materials, such as the non-limiting example of steel or titanium or combinations of metallic materials and can be formed in other suitable manners, such as the non-limiting example of forging.

While the embodiment of the lowering assembly shown in FIGS. 1-6 is described above as having the structure of a unity body, it should be appreciated that in other embodiments, the support member 12, the plurality of rung members 14a-14g and the reinforcement member 16 can be discrete components that are assembled together into the lowering assembly 10.

Referring again to the embodiment shown in FIGS. 1-6, a quantity of seven (7) rung members 14a-14g are illustrated. It should be appreciated that the quantity of the rung members can be a function of the weight of the trimmed limbs or removed tree sections being lowered by the lowering assembly 10. In one non-limiting example, in the event the weight of the trimmed limbs being lowered is on the small side, the lowering assembly can employ fewer than seven (7) rung members. In another non-limiting example, in the event the weight of the trimmed limbs being lowered is on the larger side, the lowering assembly can employ more than seven (7) rung members.

Referring again to FIGS. 1-6, the upper line guide 18 is configured to maintain the rigging line 40 in an interlaced engaged arrangement with the rung member 14a as the rigging line 40 moves through the rung members 14a-14g of the lowering assembly 10. In a similar manner, the lower line guide 20 is configured to maintain the rigging line 40 is an interlaced engaged arrangement with the rung member 14g as the rigging line 40 moves through the lowering assembly 10. In the illustrated embodiment, the upper and lower line guides 18, 20 each have the form of a circumferentially oriented spiral member with an aperture 70 formed within spiral member. However, it should be appreciated that the upper and lower line guides 18, 20 can have other forms sufficient to maintain the rigging line 40 is an interlaced engaged arrangement with the rung members 14a and 14g respectively.

Figure 7:
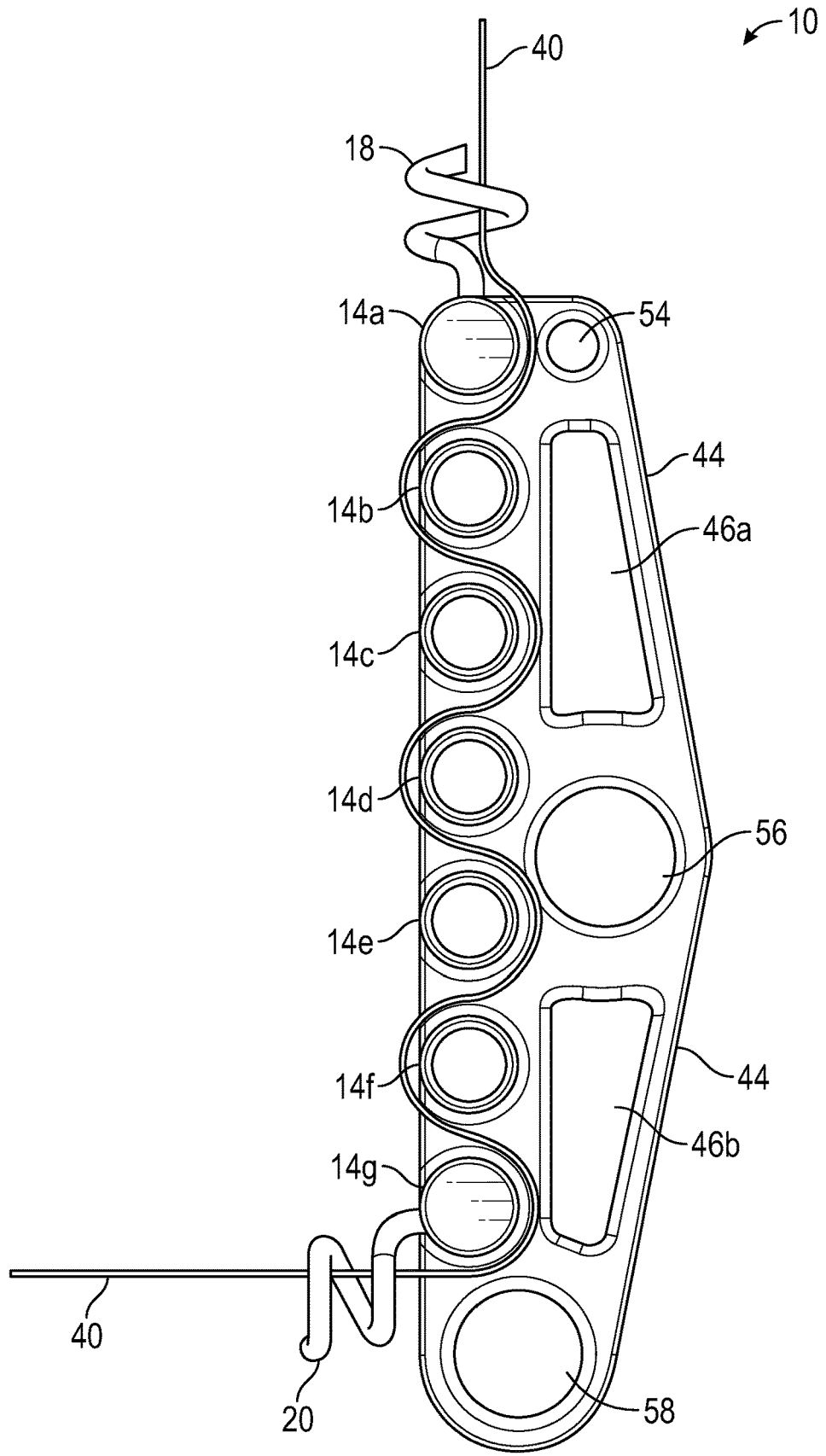
FIG. 7 is a front view of the tree section lowering assembly of FIG. 1 illustrating an interlaced rigging line.

Referring now to FIG. 7, the lowering assembly 10 is illustrated with the rigging line 40 in an interlaced arrangement with the plurality of rung members 14a-14g and guided by the upper and lower line guides 18, 20. As will be described in more detail below, the rigging line 40 in the interlaced arrangement with the lowering assembly 10, is configured to frictionally engage the plurality of rung members 14a-14e as the rigging line 40 moves through the lowering assembly 10. In the illustrated embodiment, the rigging line 40 has the form of a multi-stranded, braided line formed from one or more polymeric materials, such as for example polyester and polyolefin fibers. In alternate embodiments, the rigging line 40 can have other forms sufficient for the functions described herein.

Figure 8:
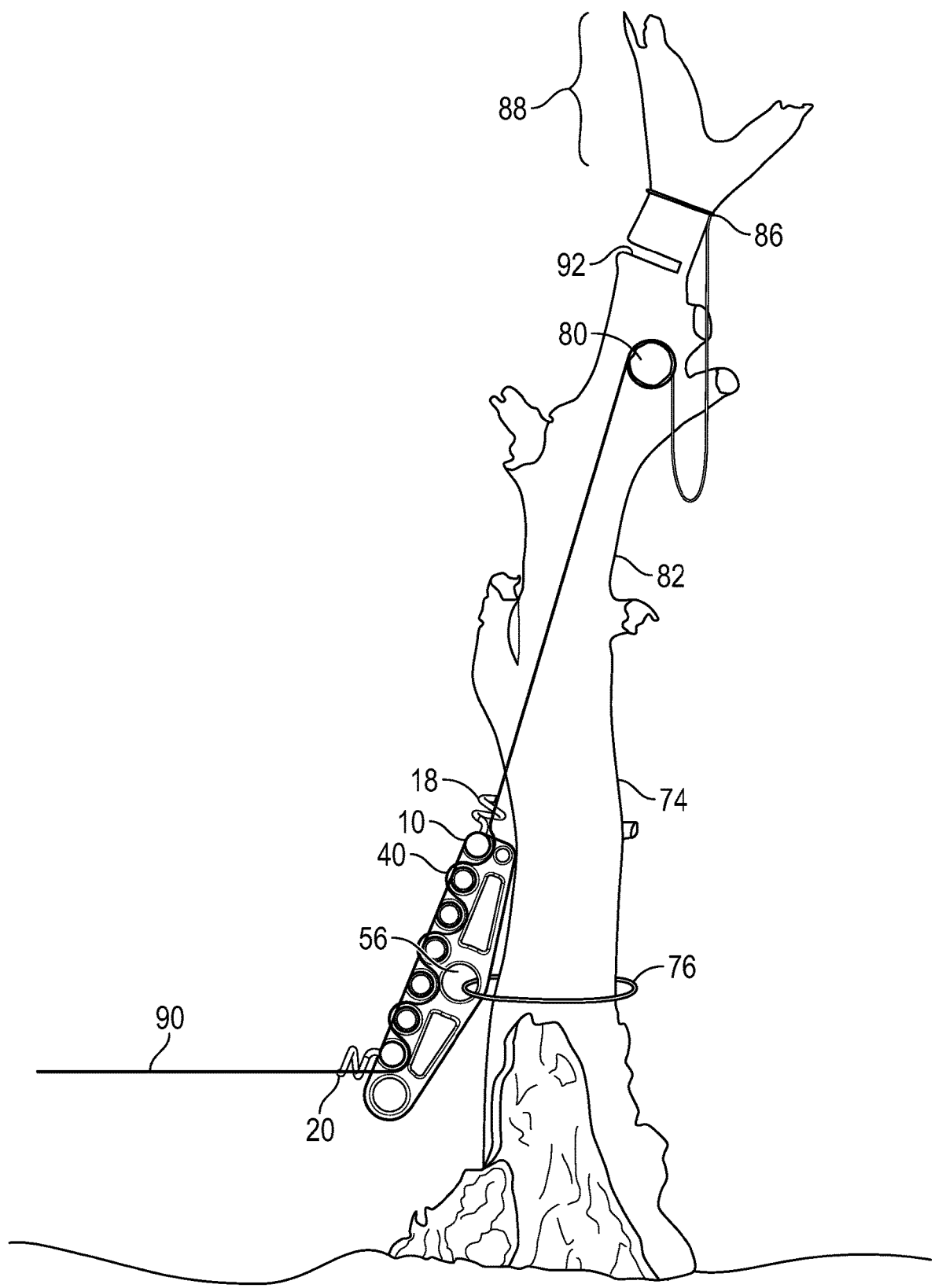
FIG. 8 is a side schematic illustration of the tree section lowering assembly of FIG. 1 shown in use.
Figure 9:
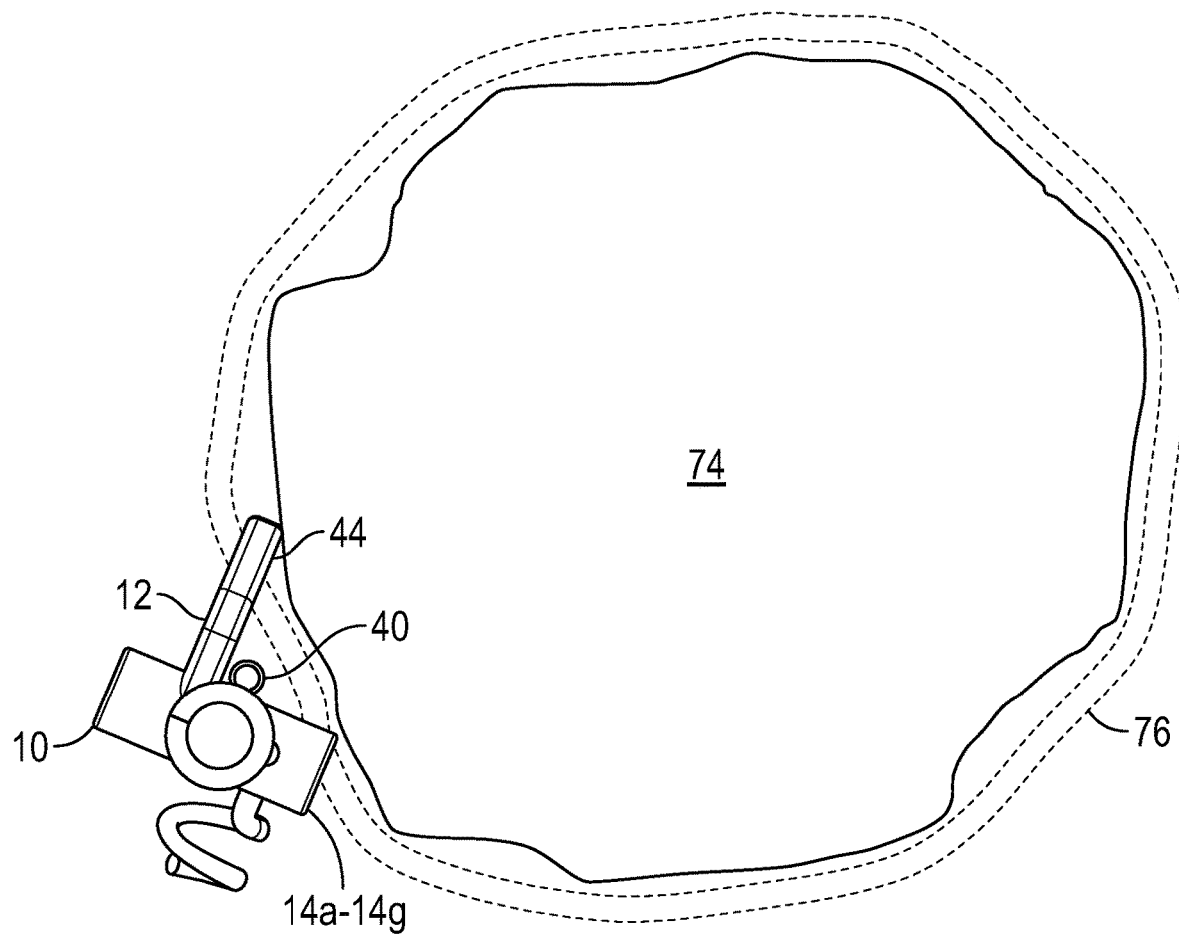
FIG. 9 is a plan schematic illustration of the tree section lowering assembly of FIG. 1 shown fastened to a tree trunk.
Figure 10:
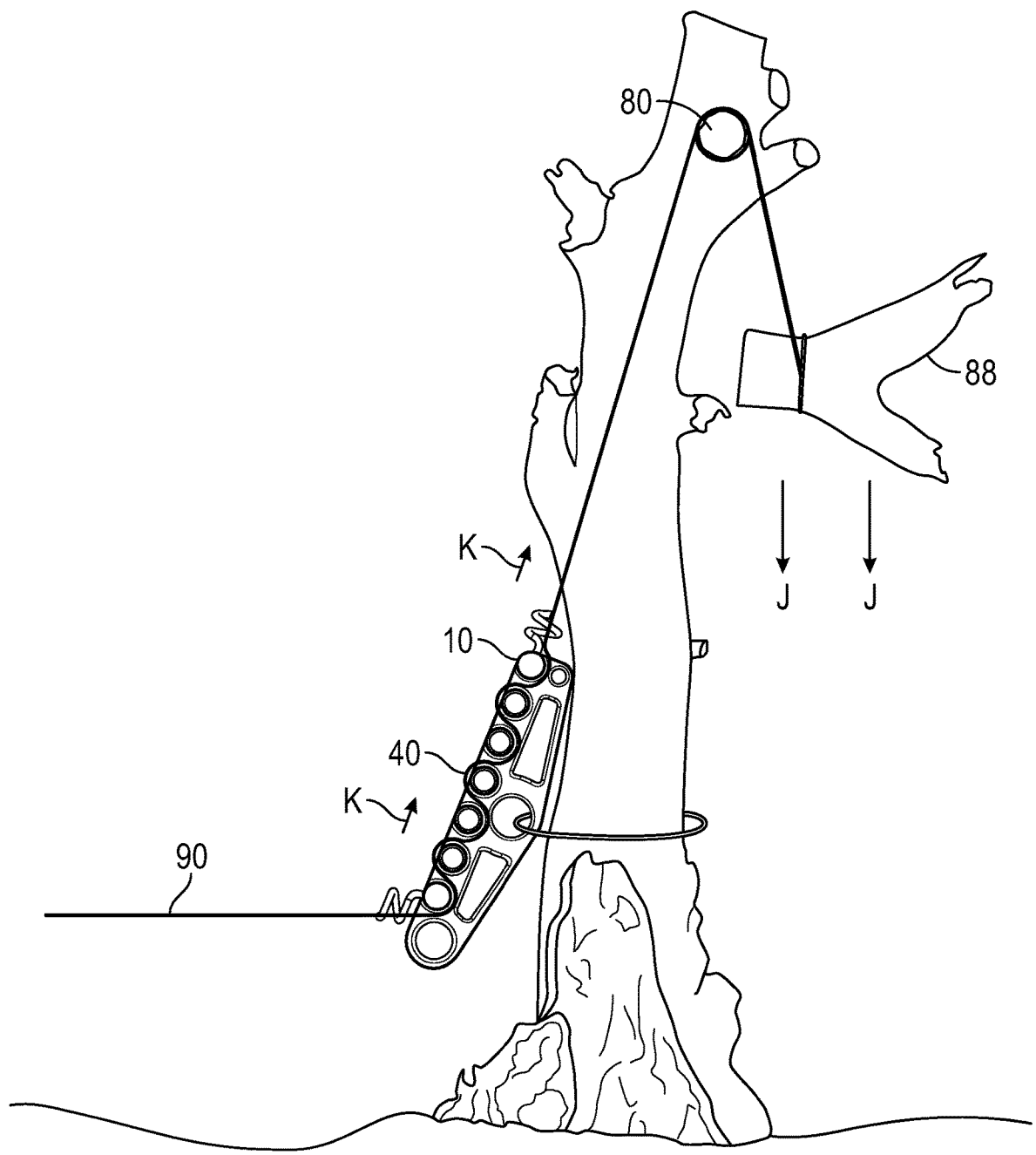
FIG. 10 is a side schematic illustration of the tree section lowering assembly of FIG. 1 shown with a tree section partially lowered to the ground.

Referring now to FIGS. 8-10, the method of using the lowering assembly 10 will now be described in the context of lowering a tree section from an elevated location. Referring first to FIGS. 8 and 9, in a first step the lowering assembly 10 is secured to a stable structure, such as the non-limiting example of a tree trunk 74. In the illustrated embodiment, a fastening line 76 engages the second attachment aperture 56 and is wrapped around the tree truck 74 to secure the lowering assembly 10 in place near a base of the tree. However, in other embodiments, the lowering assembly 10 can be secured to other stable structures in other desired manners.

Referring now to FIG. 9, the lowering assembly 10 is shown in a secured arrangement with the tree trunk 74 with the fastening line, shown in phantom at 76. In the secured orientation, the lowering assembly 10 is oriented such that the plurality of rung members 14a-14g and the spline 44 of the support segment 12 cooperate to contact an outer surface of the tree trunk 74 in a manner such as to form an opening between the lowering assembly 10 and the outer surface of the tree trunk 74. In operation, as the rigging line 40 moves through the plurality of rung members 14a-14g in the interlaced arrangement, a portion of the rigging line 40 is positioned in the opening. Advantageously, locating a portion of the rigging line 40 within the opening allow free movement of the rigging line 40 within the lowering assembly 10 without interference with the tree trunk 74.

Referring again to FIG. 8 in a next step, a rigging pulley 80 is secured to an upper location of the tree 82. The rigging pulley 80 is conventional in the art and includes a wheel with a grooved rim around which the rigging line 40 cord passes. The rigging pulley is configured to change the direction of a force applied to the rigging line 40. In a next step, a first end 86 of the rigging line 40 is secured to a section 88 of the tree to be cut and lowered to the ground. Next, the rigging line 40 is then looped around the rigging pulley 80 and extended in a direction toward the lowering assembly 10.

Referring again to FIG. 8 in a next step, the rigging line 40 is inserted into the upper line guide 18 and interlaced among the plurality of rung members 14a-14g. The rigging line 40 is then inserted into the lower line guide 20 and a second end 90 of the rigging line 40 is extended in a direction away from the assembly 10. The second end of the rigging line 40 is secured by a first person (not shown) in a manner such as to place the rigging line 40 in a taut arrangement as the rigging line 40 extends through the lowering assembly 10 and to the secured first end 86. In a next step, a second person (not shown) ascends the tree 82 and subsequently forms a cut 92 in the tree 82 that defines the section 88 to be lowered.

Referring now to FIG. 10 in a next step, the cut 92 is completed and the section 88 begins to fall toward the ground. In a next step, as the section 88 begins to fall, tension is the rigging line 40 quickly increases. The tension in the rigging line 40 is controlled by the interlaced arrangement of the rigging line 40 with the plurality of rung members 14a-14g. Without being held to the theory, it is believed the sliding, frictional engagement of the rigging line 40 over and under adjacent rung members acts to control the leverage of the first person holding the second end 90 of the rigging line 40 over the falling section 88.

Referring again to FIG. 10 in a final step, the section 88 is safely lowered to the ground, as shown by direction arrows J, in a controlled manner as the rigging line 40 moves in an upward direction toward the rigging pulley 80, as shown by direction arrows K, through the interlaced arrangement with the plurality of rung members 14a-14g of the lowering assembly 10.

Figure 11:
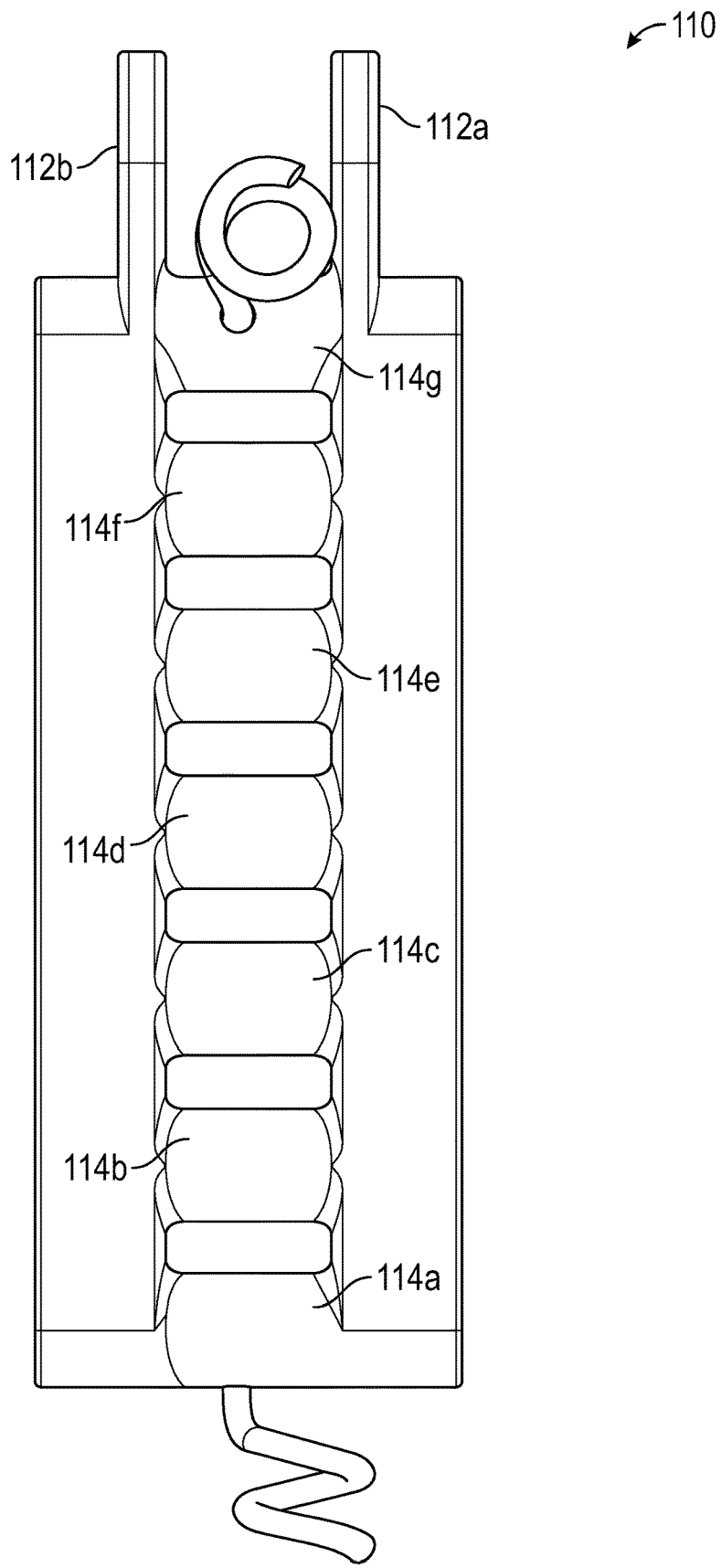
FIG. 11 is a bottom view of a second embodiment of a tree section lowering assembly in accordance with the invention.

Referring again to the embodiment shown in FIG. 4, the lowering assembly 10 is shown with the plurality of rung members 14a-14e extending in a cantilevered arrangement from the support member 12. It is contemplated that the plurality of rung members 14a-14e can be supported by different structural arrangements. Referring now to FIG. 11, a second non-limiting embodiment of a lowering assembly is shown at 110. The lowering assembly 110 includes a first support member 112a and a second support member 112b. In the illustrated embodiment, the first and second support members 112a, 112b are the same as, or similar to the support member 12 shown in FIGS. 1-6 and described above. However, in other embodiments, the first and second support members 112a, 112b can be different from the support member 12.

Referring again to FIG. 11, a plurality of rung members 114a-114g extend from the first support member 112a to the second support member 112b. In the illustrated embodiment, the rung members 114a-114g are the same as, or similar to the rung members 14a-14g shown in FIGS. 1-6 and described above. However, in other embodiments, the rung members 114a-114g can be different from the rung members 14a-14g.

The second support member 112b is configured to provide additional rigidity to the assembly 110, thereby advantageously allowing the assembly 110 to control tree sections having larger weights.

While the tree section lowering assemblies 10, 110 have been described in the context of lowering limbs and sections of trees, it is within the contemplation of the invention that the tree section lowering assembly can be used in other environments. In one non-limiting example, it is contemplated that the tree section lowering assembly can be used is instances where heavy loads are lowered from elevated locations.

In accordance with the provisions of the patent statutes, the principle and mode of operation of the tree section lowering assembly have been explained and illustrated in certain embodiments. However, it must be understood that the tree section lowering assembly may be practiced otherwise than as specifically explained and illustrated without departing from its spirit or scope.

What is claimed is:

1. A tree section lowering assembly comprising:
    a support member having a first side, an opposing second side, a first end, and an opposing second end;
    a plurality of rung members extending from the first side of the support member, each of the plurality of rung members having an outer surface configured to facilitate a frictional, sliding engagement with an interlaced rigging line;
    a reinforcement member extending from the second side of the support member and configured to structurally support the support member;
    an upper line guide extending from a rung member at the located first end of the support member, the upper line guide having a spiral shape;
    a lower line guide extending from a different rung member located at the second end of the support member, the lower line guide having a spiral shape; and
    a rigging line connected at a first end to a tree section, an opposing second end retained by an operator, and an intermediate portion engaged with the plurality of rung members, wherein a wrap of the rigging line around each of the plurality of rung members is no greater than 180°.

2. The tree section lowering assembly of claim 1, wherein the support member includes a plurality of attachment apertures configured to facilitate attachment of the tree section lowering assembly to a stable structure.

3. The tree section lowering assembly of claim 1, wherein the support member includes a plurality of cutouts configured to reduce a weight of the tree section lowering assembly.

4. The tree section lowering assembly of claim 1, wherein the support member has a length that extends beyond an outermost rung member.

5. The tree section lowering assembly of claim 1, wherein each of the plurality of rung members has a longitudinal axis that forms an angle of about 90° with a longitudinal axis of the support member.

6. The tree section lowering assembly of claim 1, wherein the plurality of rung members includes opposing outermost rung members and a plurality of inner rung members, and wherein the outermost rung members have a solid cylindrical form.

7. The tree section lowering assembly of claim 6, wherein each of the plurality of inner rung members have a hollow cylindrical form.

8. The tree section lowering assembly of claim 1, wherein the reinforcement member extends from one outermost rung member to an opposing outermost rung member.

9. The tree section lowering assembly of claim 1, wherein the reinforcement member includes a plurality of apertures configured to reduce a weight of the tree section lowering assembly.

10. The tree section lowering assembly of claim 1, wherein the support member, the plurality of rung members and the reinforcement member are formed as a unitary, one piece structure.

11. A method of using a tree section lowering assembly comprising the steps of:
    attaching the tree section lowering assembly to a stable structure, the tree section lowering assembly have a plurality of rung members extending from a support member, an upper line guide extending from a rung member located at a first end of the support member and having a spiral shape and a lower line guide extending from a different rung member located at a second end of the support member and having a spiral shape;
    extending a rigging line from a ground location through the plurality of rung members of the tree section lowering assembly in an interlacing manner;
    extending the rigging line from the tree section lowering assembly and securing the rigging line to a section of the tree to be removed and lowered to a ground surface;
    separating the section of the tree to be removed and lowered to a ground surface from the tree;
    tensioning the rigging line;
    facilitating a frictional, sliding engagement of the interlaced rigging line with the plurality of rung members, thereby controlling lowering of the section of the tree to the ground surface, wherein a wrap of the rigging line around each of the rung members is no greater than 180°.

12. The method of using a tree section lowering assembly of claim 11, including the step of attaching the tree section lowering assembly using any of a plurality of attachment apertures positioned in the support member.

13. The method of using a tree section lowering assembly of claim 11, including the step of inserting a plurality of cutouts into the support member, the plurality of cutouts configured to reduce a weight of the tree section lowering assembly.

14. The method of using a tree section lowering assembly of claim 11, including the step of extending a length of the support member beyond an outermost rung member.

15. The method of using a tree section lowering assembly of claim 11, including the step of forming an angle of about 90° between a longitudinal axis of each of the plurality of rung members and a longitudinal axis of the support member.

16. The method of using a tree section lowering assembly of claim 11, including the step of forming outermost rung members having a solid cylindrical form.

17. The method of using a tree section lowering assembly of claim 11, including the step of forming inner rung members having a hollow cylindrical form.

18. The method of using a tree section lowering assembly of claim 11, including the step of forming a reinforcement member adjacent the support member, wherein the reinforcement member extends from one outermost rung member to an opposing outermost rung member.

19. The method of using a tree section lowering assembly of claim 18, including the step of forming a plurality of apertures in the reinforcement member, the plurality of apertures configured to reduce a weight of the tree section lowering assembly.

20. The method of using a tree section lowering assembly of claim 18, including the step of forming the support member, the plurality of rung members and the reinforcement member are formed as a unitary, one piece structure.

* * * * *